US010970534B2

(12) United States Patent
Kozlovsky et al.

(10) Patent No.: US 10,970,534 B2
(45) Date of Patent: Apr. 6, 2021

(54) DOCUMENT PROCESSING SYSTEM CAPTURE FLOW COMPILER

(71) Applicant: OPEN TEXT CORPORATION, Waterloo (CA)

(72) Inventors: Vitaly Stanislavovitch Kozlovsky, Saint-Petersburg (RU); Mikhail Yurievitch Zakharov, Saint-Petersburg (RU); Aleksandr Yevgenyevitch Maklakov, Saint-Petersburg (RU); Alexey Vyatcheslavovitch Petrochenko, Saint-Petersburg (RU)

(73) Assignee: OPEN TEXT CORPORATION, Waterloo (CA)

( * ) Notice: Subject to any disclaimer, the term of this patent is extended or adjusted under 35 U.S.C. 154(b) by 135 days.

(21) Appl. No.: 16/259,656

(22) Filed: Jan. 28, 2019

(65) Prior Publication Data
US 2019/0236350 A1    Aug. 1, 2019

(30) Foreign Application Priority Data
Jan. 29, 2018  (RU) ................................ 2018103208

(51) Int. Cl.
*G06K 9/00* (2006.01)
*H04N 1/04* (2006.01)
(Continued)

(52) U.S. Cl.
CPC ......... *G06K 9/00469* (2013.01); *G06F 16/93* (2019.01); *G06F 40/151* (2020.01);
(Continued)

(58) Field of Classification Search
CPC ........... G06K 9/00469; G06K 9/00993; G06K 9/00442; G06K 2209/01; G06F 40/151;
(Continued)

(56) References Cited

U.S. PATENT DOCUMENTS 9,207,887 B1 * 12/2015 Lahey .................. G06F 3/1211
2005/0243365 A1    11/2005 Noda
(Continued)

OTHER PUBLICATIONS

Oracle® Fusion Applications Financials Implementation Guide 11g Release 7 (11.1.7) Part No. E20375-08, 2013 (Year: 2013).*
(Continued)

*Primary Examiner* — Nizar N Sivji
(74) *Attorney, Agent, or Firm* — Sprinkle IP Law Group

(57) ABSTRACT

A system for document capture comprising a communication interface, a processor coupled to the communications interface, and a computer readable medium coupled to the processor. The computer readable medium stores a set of computer executable instructions that include instructions executable by the processor to receive an input capture flow comprising a first sequence of steps representing configurable code components of a document capture system. A step in the first sequence of steps holds configuration information for a corresponding configurable code component. The instructions further include instructions executable to compile the input capture flow into a capture process that defines a processing order for the configurable code components and setup attribute values for the configurable code components. Compiling the input capture flow into the capture process comprises optimizing the capture flow into a second sequence of steps and compiling the second sequence of steps into the capture process.

16 Claims, 11 Drawing Sheets

(51) Int. Cl.
  *H04N 1/00* (2006.01)
  *G06F 16/93* (2019.01)
  *G06F 40/151* (2020.01)
(52) U.S. Cl.
  CPC ..... *G06K 9/00442* (2013.01); *G06K 9/00993* (2013.01); *H04N 1/00241* (2013.01); *H04N 1/0461* (2013.01); *G06K 2209/01* (2013.01)
(58) Field of Classification Search
  CPC .. G06F 16/93; H04N 1/0461; H04N 1/00241; G06T 2207/30144; G06T 2207/30176
  See application file for complete search history.

(56) References Cited

U.S. PATENT DOCUMENTS

| | | | |
|---|---|---|---|
| 2008/0291486 A1* | 11/2008 | Isles | G06Q 30/0236 358/1.15 |
| 2009/0109230 A1 | 4/2009 | Miller et al. | |
| 2010/0123930 A1 | 5/2010 | Tomizawa | |
| 2014/0068611 A1 | 3/2014 | McGrath et al. | |
| 2014/0115591 A1 | 4/2014 | Chen | |
| 2016/0335494 A1* | 11/2016 | Ho | G06F 40/226 |
| 2019/0197306 A1* | 6/2019 | Ho | G06F 40/226 |
| 2019/0238708 A1 | 8/2019 | Kozlovsky et al. | |

OTHER PUBLICATIONS

Nuance Document Imaging Autostore, 2016 (Year: 2016).*
Captiva InputAccel 6.5 Tutorial, 2012 (Year: 2012).*
Office Action issued for U.S. Appl. No. 16/269,663, dated Jan. 7, 2020, 47 pages.
Author unknown, "EMC Captiva Capture: Captiva Designer Guide", EMC Corporation, Hopkinton, MA, © 1994-2017, 164 pages.
Roth, Scott M., "Captiva InputAccel 6.5 Tutorial", Retrieved from msroth.wordpress.com, Feb. 2012, <<https://msroth.files.wordpress.com/2012/03/captiva-inputaccel-tutorial1.pdf>>, 49 pages.

* cited by examiner

DOCUMENT PROCESSING SYSTEM CAPTURE FLOW COMPILER

TECHNICAL FIELD

The present disclosure relates to document capture systems. More particularly, embodiments relate to compilers that compile capture flows into capture processes. Even more particularly, embodiments relate to capture flow compilers that optimize capture flows or capture processes.

BACKGROUND

Document capture solutions use capture processes to convert information from source documents, such as printed documents, faxes, and email messages, into digitized data, and to store the data and images into back-end systems for fast and efficient data retrieval. These solutions can help take control of large volumes of structured, unstructured, and semi-structured data and transform critical documents into process-ready digital content that can be integrated with broader, computer-facilitated, processes of an organization.

A number of document capture solutions provide process design tools that allow users to design and deploy capture processes having multiple steps. A process design tool may provide a graphical user interface that allows a user to graphically design capture processes, from capturing of the documents to delivering the documents to a destination content repository or other target system. In some implementations, when the user indicates that he or she is satisfied with a capture process design, the process design tool compiles the design into a capture process used by a computer system to capture and process documents.

A capture process may have a complicated flow with multiple branches and steps. In practice, this can lead to the process design tool compiling a process with redundant or unnecessary steps, resulting in an inefficient use of computer resources.

SUMMARY

Systems and methods for optimizing digital document capture processes are disclosed. One embodiment is a system comprising a communication interface, a processor coupled to the communications interface, and a computer readable medium coupled to the processor. The computer readable medium stores a set of computer executable instructions that include instructions executable by the processor to receive an input capture flow, compile the input capture flow into a capture process that defines a processing order for configurable code components of a document process system and deploy the capture process. The input capture flow can comprise a first sequence of steps representing configurable code components of the document processing system where the steps in the first sequence hold configuration information for corresponding configurable code components. Compiling the input capture flow into the capture process can comprise optimizing the capture flow into a second sequence of steps comprising steps from the first sequence of steps. The capture process, according to one embodiment, comprises instructions to the document capture system specifying the configurable code components to use, a processing order for the configurable code components and setup attribute values for the configurable code components. The capture process compiled from the second sequence of steps can be deployed to a capture system.

One embodiment comprises a communication interface, a processor coupled to the communications interface and a computer readable medium coupled to the processor. The computer readable medium may store a set of computer executable instructions that are executable to provide a capture flow compiler. The capture flow compiler can be configured to receive an input capture flow comprising a first sequence of steps representing configurable code components of a document capture system, wherein a step in the first sequence of steps holds configuration information for a corresponding configurable code component. The capture flow compiler can further compile the input capture flow into a capture process that defines a processing order for the configurable code components and setup attribute values for the configurable code components. Compiling the input capture flow into the capture process can comprise determining an optimized second sequence of steps comprising steps from the first sequence of steps and compiling the optimized second sequence of steps into the capture process. The capture flow compiler can further deploy the capture process to a document capture system. The capture flow compiler may be just-in-time compiler or a look ahead compiler.

According to one embodiment, determining the second sequence of steps comprises reordering, for parallel execution, a group of independent steps indicated for sequential execution in the input capture flow. Determining the second sequence of steps may further include eliminating duplicative steps from the input capture flow.

According to one embodiment, compiling the input capture flow into the capture process comprises building an in-memory model of the input capture flow and manipulating the in-memory model to reorder the group of independent steps and eliminate the duplicative step. The in-memory model, in one embodiment, comprises a directed graph of vertexes and edges with the vertexes representing the steps in the first sequence of steps and the edges representing links between steps in the first sequence of steps based on input and output attributes specified for the steps in the input capture flow. The directed graph may be built based on instruction scheduling rules.

According to one embodiment, compiling the input capture flow into the capture process comprises identifying, from the directed graph, steps of a same type that have identical input attributes and output attributes and eliminating all but one of the set of steps of the same type that have identical input attributes and output attributes. In addition, or in the alternative, compiling the input capture flow into the capture process may comprise ordering steps represented at a same level in the directed graph for parallel execution.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Various embodiments are illustrated in the figures, like numerals being generally used to refer to like and corresponding parts of the various drawings. Descriptions of well-known starting materials, processing techniques, components and equipment are omitted so as not to unnecessarily obscure the invention in detail. It should be understood, however, that the detailed description and the specific examples, while indicating preferred embodiments of the systems and methods, are given by way of illustration only and not by way of limitation. Various substitutions, modifications, additions and/or rearrangements within the spirit and/or scope of the underlying inventive concept will become apparent to those skilled in the art from this disclosure.

Systems and methods for optimizing digital document capture processes are disclosed. In various embodiments, a design tool is provided that allows a user to design a capture flow. When the user is satisfied with the capture flow, a capture flow compiler ("CF compiler") compiles the capture flow into instructions usable by a capture system to implement the capture flow. In particular, the CF compiler will perform the operation of optimization of the input capture flow. As part of performing the operations of optimization, the CF compiler can apply an instruction scheduling paradigm. In addition, the CF compiler may eliminate duplicate steps.

Figure 1:
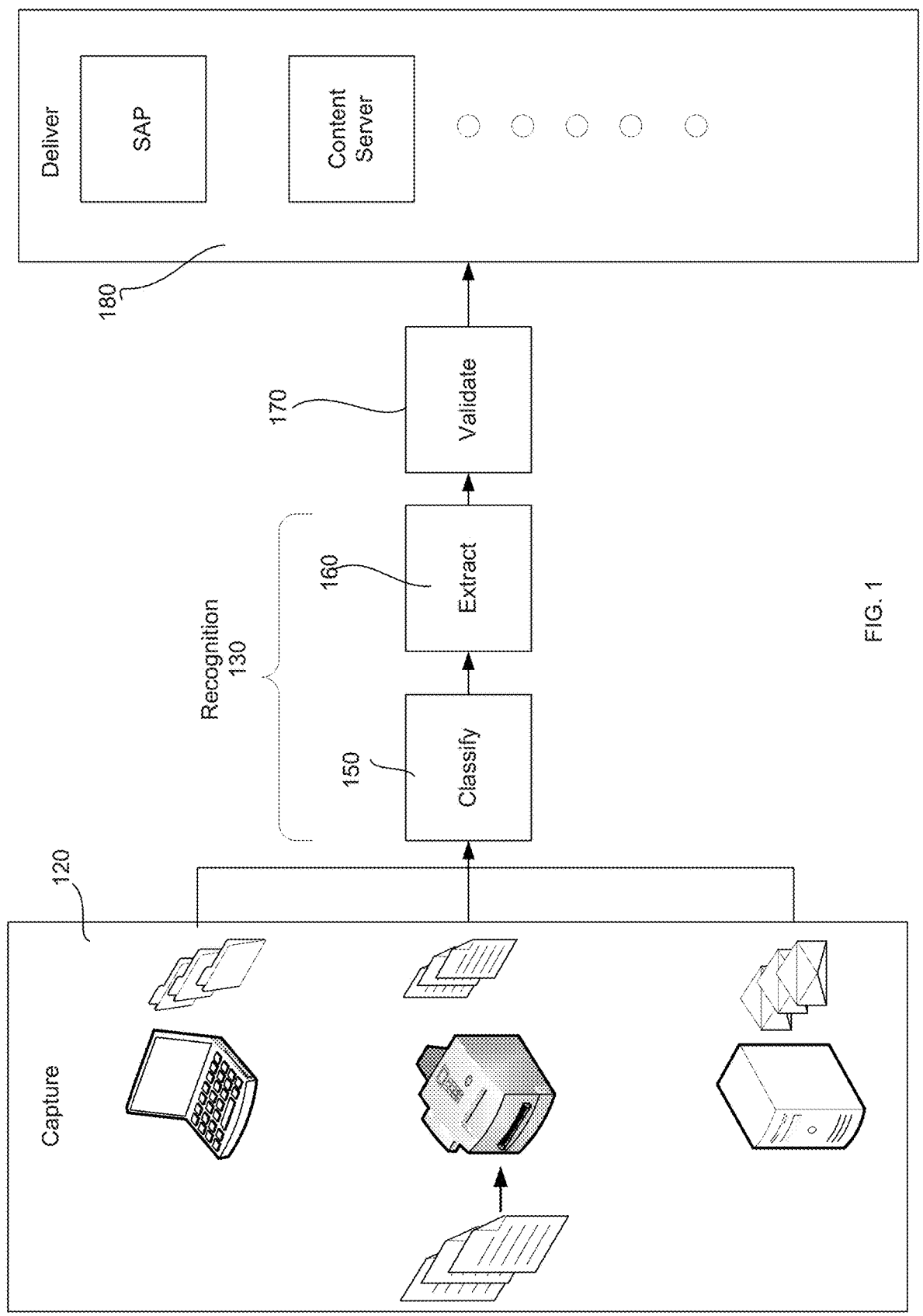
FIG. 1 is a block diagram illustrating stages of an embodiment of a flow to capture data.

FIG. 1 is a block diagram illustrating stages of an embodiment of a flow to capture data. In capture stage 120, documents from a variety of sources including scanners, fax server, email servers, file systems, web services and other sources are captured. In the example shown, electronic documents are imported from a file system, hard copy documents are scanned and transformed into digital content (e.g., by scanning the physical sheet(s) to create a scanned image) and emails captured. In a recognition stage 130, text, machine markings or other data within an image is identified and extracted. In one embodiment, recognition stage 130 can include a classify stage 150 and an extraction stage 160. In classify stage 150, automated classification technology identifies different document types through a combination of text- and image-based analysis. In some embodiments, classification includes detecting a document type corresponding to an associated data entry form. At extraction stage 160, data is extracted from the digital content, for example through optical character recognition (OCR) and/or optical mark recognition (OMR) techniques. Extracted data is validated at validation stage 170. In various embodiments, validation may be performed at least in part by an automated process, for example by comparing multiple occurrences of the same value, by performing computations or other manipulations based on extracted data and other data. Automated validation may involve integration with another data source, usually a database or enterprise application such as ERP. In various embodiments, all or a subset of extracted values, (e.g., those for which less than a threshold degree of confidence is achieved through automated extraction and/or validation), may be validated manually by a human indexer or other operator. Once all data has been validated, output is delivered at delivery stage 180. During delivery, data and document images are exported and made available to other content repositories, databases, and business systems in a variety of formats.

Figure 2:
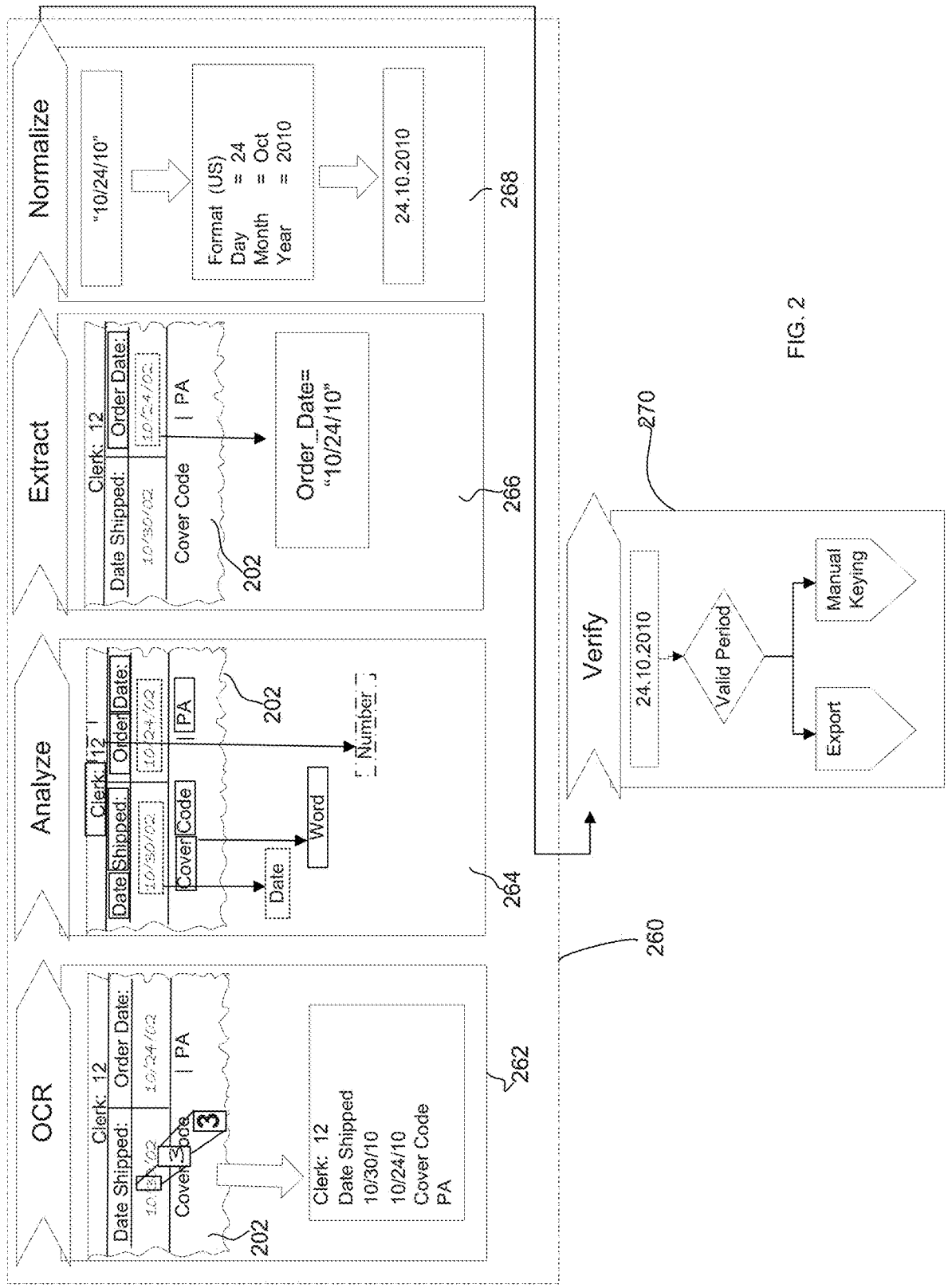
FIG. 2 illustrates an example of one embodiment of processing a document page image.

Each stage may include a number of steps. FIG. 2 illustrates an example of one embodiment of processing an image 202 of a document page through an extraction stage 260 and validation stage 270. The image 202 may have been captured and classified in prior stages. Extraction stage 260 may include an OCR step 262 to turn pixels in an image 202 into characters. It can be noted that, in some embodiments, the image 202 may be classified as being of a particular document type and the OCR step 262 may, based on the document type, be configured to perform OCR on specific zones in the image. In other embodiments, the OCR step 262 may perform whole page recognition. Extraction stage 260 may further include an analyze step 264 in which rules are applied to the recognized text to identify and tag meaningful entities. In an extract step 266, rules are applied to extract particular data among alternatives. For example, the extract step may apply rules to extract a particular date entry from among several detected date entries. A normalization step 268 may normalize data into a format used by subsequent processing in a capture system. For example, a string may be decomposed into subunits and reformatted according to rules.

FIG. 2 further illustrates a validation stage 270. In the validation stage, extracted data is checked against validation rules. Validated data can proceed to a delivery stage for export. In some cases, data that cannot be validated can be forwarded to an operator for manual keying (manual indexing of values).

Figure 3:
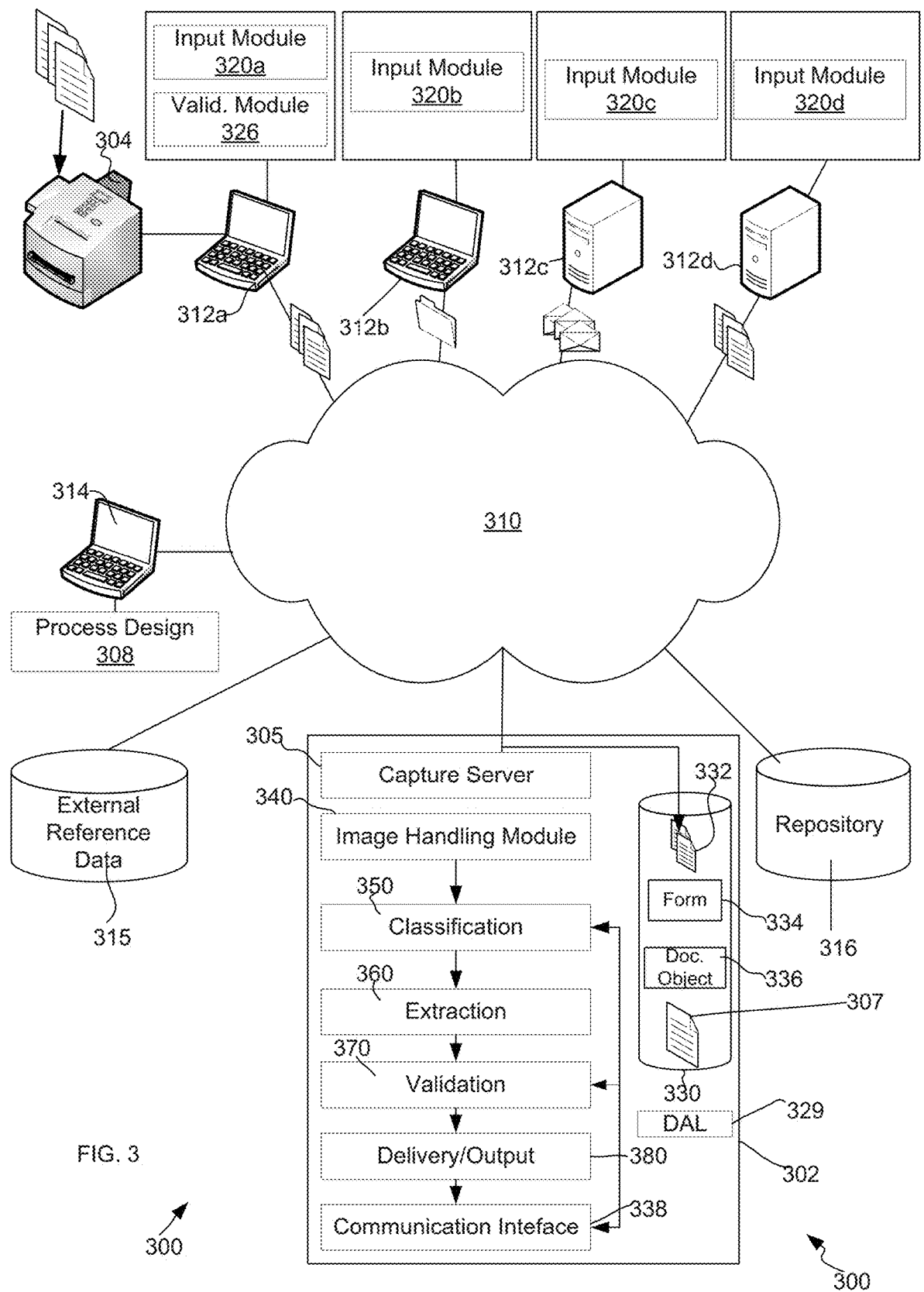
FIG. 3 is a block diagram illustrating an embodiment of a document processing system.

FIG. 3 is a block diagram illustrating an embodiment of a document processing system 300. In the example shown, system 300 comprises a document capture system 302 communicatively coupled to capture system clients 312a, 312b, 312c, 312d (generally referred to as capture system clients 312), a process designer operator system 314, an external reference data source 315 and a destination repository 316 by a network 310. Document capture system 302 and capture system clients 312 execute configurable code components to provide a system that implements a process to convert information from printed documents, faxes, email messages or other documents into digitized data, and to store the data and images into back-end systems for fast and efficient data retrieval.

In a capture stage, system 300 captures paper, faxes, film, images, or imported electronic documents (structured and unstructured) through fax, scanner, network drives, remote sites, via web services or other sources. According to one embodiment, capture system clients 312a, 312b, 312c, 312d can execute input respective modules 320a, 320b, 320c, 320d (referred to generally as input modules 320) to capture documents and send document images and associated attribute values to capture system 302. Input modules 320 may capture documents having a variety of formats. In the embodiment of FIG. 3, for example, a capture system client 312*a* is attached to a scanner 304 that can generate images of document pages. An input module 320*a* can thus be configured to capture images of documents via scanner 304 and provide an interface that allows an operator to perform operations on the images, input associated attributes or perform other actions. Input module 320*a* sends the resulting document data (for example, page images, operator entered attribute values, system generated attribute values) to document capture system 302 for processing. Further in FIG. 3, input module 320*b* is configured to generate images of documents in a file system or capture documents of particular file types and send the document data to document capture system 302 for processing. Input module 320*c* collects images of emails from an email server and sends the emails to document capture system 302 for processing. Input module 320*d* provides a web service input module that can receive information necessary to retrieve documents via a web service, collect the documents via the web service and provide the documents to document capture system 302.

Document capture system 302 includes a document capture system repository 330, which may comprise an internal file system, network file system, internal database or external database or other type of repository or combination thereof. Document data is received and stored in a capture store 332 in a document capture system repository 330. In some embodiments, document data is received in batches. System 302 may include a data access layer (DAL) 329. The DAL 329 is the programming layer that provides access to the data stored in the various repositories and databases used by capture system 302. For example, the DAL 329 can provide an API that is used by modules to access and manipulate the data within the database without having to deal with the complexities inherent in this access.

Document capture system 302 further classifies received documents. For example, document capture system 302 may identify documents based on document type so that documents are routed to the appropriate data extraction process. Document capture system 302, in an extraction stage, performs OCR to extract machine and handprint text. Document capture system 302 may use zonal OCR for structured documents and full-text OCR for unstructured documents. Document capture system 302 may also perform OMR to recognize bar codes and other data. The extracted data may be stored in a structured representation.

Extracted data can be validated in a validation stage. Data validation may be performed, at least in part, by document capture system 302 by accessing external data from external data reference source 315 via a network 310. For example, document capture system 302 may validate data formulas against an external database or custom business rules using scripting events. As another example, an external third party database that associates street addresses with correct postal zip codes may be used to validate a zip code value extracted from a document. In various embodiments, all or a subset of extracted values, (e.g., those for which less than a threshold degree of confidence is achieved through automated extraction and/or validation), may be validated manually by a human indexer or other operator using a user interface configured to support validation.

In some embodiments, once validation has been completed the resulting raw document image and/or form data are delivered as output, for example by storing the document image and associated data in a destination repository 316, such as an enterprise content management (ECM) or other repository. Document information can be stored as images, text, or both. In some embodiments, document capture system 302 supports conversion to PDF, full-text OCR, and PDF compression.

Document capture system 302 may execute various code components to process the document images received from input modules 320 through various states. According to one embodiment, document capture system 302 comprises a capture server 305 to manage processing of documents and set of production modules to process the documents. The capture server 305 maintains consistency of processing a capture flow, sets tasks, orders and routes documents (document images and associated data) to pass documents to the production modules of the capture system 302. In the illustrated embodiment, the production modules include image handling module 340, classification module 350, extraction module 360, validation module 370 and delivery/output module 380.

According to one embodiment, an image handling module 340 enhances document images for subsequent recognition steps. Document image data, potentially enhanced by an image handling module 340, is provided to a classification module 350 that uses data forms 334 to classify each document by type and create an instance of a type-specific object 336 (e.g., a form instance) for an identified document. The object instance 336 may reference the associated image. In some cases, document capture system 302 may provide an interface to enable an operator to confirm or update the document identification.

Data extraction module 360 uses OCR, OMR, and/or other techniques to extract data values from the document image and uses the extracted values to populate the corresponding document type object instance, which may be persisted in repository 330. For example, data extraction module 360 may extract field data from a document image into the document type object instance for a data entry form. Thus, in some embodiments a document is classified by type and an instance of a corresponding data entry form is created and populated with data values extracted from the document image.

Data extraction module 360 may provide a score or other indication of a degree of confidence with which an extracted value has been determined based on a corresponding portion of the document image. In some embodiments, for each data entry form field, a corresponding location within the document image from which the data value entered by the extraction module in that form field was extracted, for example the portion that shows the text to which OCR or other techniques were applied to determine the text present in the image, is recorded.

Data extraction module 360 provides a populated document type object instance (e.g., a populated data entry form) to a validation module 370 configured to perform validation. The validation module 370 applies validation rules, such as restriction masks, regular expressions, and numeric only field properties, to validate data. The validation module 370 may communicate via a communications interface 338, for example a network interface card or other communications interface, to obtain external data to be used in validation.

In some embodiments, the validation module 370 applies one or more validation rules to identify fields that may require a human operator to validate. The validation module 370 may communicate via communications interface 338 to provide to human indexers via associated client systems, such as one or more of clients 312, tasks to perform human/manual validation of all or a subset of the extracted data. Validation may thus be performed at least in part based on input of a plurality of manual indexers each using an associated client 312 to communicate via network 310 with document capture system 302. Document capture system 302 may be configured to queue validation tasks and to serve tasks out to indexers using clients 312. Clients 312 may include a browser-based or installed client software that provides functionality to allow an operator to validate data (e.g., operator validation module 326).

According to one embodiment, the validated data is provided to a delivery/output module 380 configured to provide output via communication interface 338, for example by storing the document image and/or extracted data (e.g., structured data as captured using a corresponding data entry form or other object instance) in an enterprise content management system or other repository.

Document capture system 302 processes a compiled capture process 307 to convert information received from input modules 320, into digitized data, and to store the data and images into back-end systems, such as destination repository 316, for fast and efficient data retrieval. Process designer operator system 314 is an operator machine that runs a process design tool 308 that allows a designer to design a capture flow. The design tool 308 includes a capture flow compiler ("CF compiler") to compile the capture flow into capture process 307 that defines the processing steps for processing document images, the order in which the steps are applied and what to do with the resulting images and data. According to one embodiment, capture process 307 provides instructions to document capture system 302 on the various types of modules to use, how they are configured, the order in which to use them.

Document capture system 302 may store multiple capture processes 307 that comprise instructions for processing batches of documents. In this context, a "batch" is a defined group of pages or documents to be processed as a unit using a set of instructions specified in a capture process 307. For example, a batch may start as a stack of paper that gets scanned into the system and converted to image files that are processed as a unit. Batches, however, can also be created using data from various other sources. Batches may be created using administrative tools or by input modules 320. In some embodiments, the identity of the capture process 307 to be used to process a batch may be configured at setup in the input module 320. In other embodiments, the input module 320 may allow the operator to select the capture process 307 when creating the batch. Document capture system can route the batch data from module to module as determined by the processing instructions of a process 307.

A module may process all of the batch data at once or the batch data may be separated into smaller work units. For example, according to one embodiment, each original page becomes a node in the batch. Pages can be grouped and organized into a tree structure having a plurality of levels. For example, if eight levels are used, the pages themselves are at level 0 (the bottom), and the batch as a whole is at level 7 (the top). Levels 6-1 may represent groupings and sub-groupings of pages (e.g., analogous to a folder structure). Modules can process data at any level of the tree, as specified by the process 307.

In one embodiment, the production modules process tasks. A task is a unit of work processed by a production module. A task may comprise, for example, the data to be processed, processing instructions, and an identification so that the capture system 302 knows which batch the task belongs to when the production module returns it. Tasks may be associated with a node and step. As discussed below, a step can comprise a configuration of a module specified within a process 307. A single process 307 may contain multiple steps using the same module.

The size of a task can vary depending on the module's trigger level. Using the example of a system in which pages are grouped and organized into a tree structure discussed above, a level 0 task contains the data from a single page; a level 1 task contains the data from a document, which may hold several pages; a level 7 task contains the data from all the pages in an entire batch.

At a particular moment, a task can be in any one of a number of states. Example states include, but are not limited to, Not Ready, Ready, Working, Done, Sent, Offline, or TaskError. In one embodiment, capture system 302 only sends Ready tasks to production modules. The state of a task is manipulated by capture system 302 as well as by the modules that process it.

According to one embodiment, batches are created by the capture system 302 and stored at the capture system computer storage. The server 305 controls batch processing, forms the tasks and routes them to available production modules based on the instructions contained in the process 307.

Capture system 302 can queue tasks (e.g., at the capture server machine). In some embodiments, tasks are processed according to their priority. The batch priority can be defined by the process settings when the batch is created. If not specified, a default priority is set. Rules may be applied to determine the order of processing of batches with the same priority. For example, batches that have the same priority may be processed according to creation date and time.

Capture system 302 monitors the production modules and sends them tasks from open batches. If multiple machines are running the same production module, the server can apply rules to send the task to a particular instance. For example, the server can send the tasks to the first available module. The batch node used by the task may be locked when it is being processed and is unavailable to other modules.

When the capture system 302 receives the finished task, capture system 302 can include the batch node of that task in a new task to be sent to the next module as specified in the process 307. Capture system 302 can also send a new task to the module that finished the task if there are additional tasks to be processed by that module. If no modules are available to process the task, then system 302 queues the task until a module becomes available. According to one embodiment, server 305 and the production modules work on a "push" basis.

Each task for a process 307 may be self-contained so modules can process tasks from any batch in any order. According to one embodiment, the capture system 302 tracks each task in a batch and saves the data generated during each step of processing. This asynchronous task processing means that the modules can process tasks as soon they become available, which minimizes idle time.

According to one embodiment, attributes are used to store various types of information and carry information from module to module. Attributes can also control when and how tasks are processed.

Attributes can hold pointers to the input or output files a module creates, receives, or sends within a task. The files may be stored by system 302 along with other files. Input and output file values can be used to "connect" module steps together. For example, for a simple process with a scan input module 320*a* and an image handling module 340, the capture process 307 can set an InputImage value of the image handling module 340 equal to an output image value of the scan input module 320*a*.

Attributes may hold trigger values that are used to kick off processing when specific conditions are met. Trigger values can signal the capture system 302 to send a task to a module for processing. A trigger value may indicate a trigger level. For example, process 307 can specify that a delivery module 380 triggers at level 7 and uses the value of InputImage attribute as a trigger. In this example, when an upstream module finishes processing tasks and all the InputImage attributes for pages in a batch are set to non-zero data values, capture system 302 can send a task to the delivery module 380 to start batch processing the batch because the trigger condition has been met.

Attribute values may hold module step configuration and setup values, such as scanner settings, image settings, OCR language settings, index field definitions, and others. The settings can potentially change for every task the module processes. For example, assume ten machines that are running validation modules 370 that are all configured to accept tasks from any batches being processed. Since the tasks from different batches can have different index fields, the settings needed for each task received are potentially different. The capture system 302 can send a validation module setup attribute values in the task so that the validation module displays the correct set of index fields for each task it receives.

Attributes can hold all of the metadata that results from processing tasks in each module. For example, modules may have attributes that hold the date and time an image was scanned, operator name of the operator who scanned the image, and elapsed time to process a task. Specific modules can also have attributes for index field contents, OCR results, and error information or other information.

Attributes can hold information such as batch name, ID, description, priority, and process name. Attributes can hold user preferences, hardware configurations, machine names, and security. In most cases, system values are global in scope and do not apply to tasks contained within a batch. System values may be referenced by strings and include: $user, $module, $screen, $machine, and $server. For example, when a module stores a file that is not associated with a particular batch or process, it may use the "$module" key to store and retrieve the file from the server 305. An example of this type of file is an OCR spell-checking dictionary.

Production attributes are attributes that a module exposes to other modules. According to one embodiment, modules expose their production attributes by declaring them in a Module Definition File (MDF) (for example, a text file that contains a declaration for each defined attribute). Production attributes may include task-related input and output file values, module data values, statistical values or other values. When a process 307 is defined, the MDFs (or other declaration of attributes) of the modules used in that process may be included. Consequently, all of the attributes in the MDFs (or other declaration) are available to the process code and the process code can use the attribute values as needed. Each module can refer to the production attribute values of all the other production modules referenced in a process 307 being implemented.

Attribute values can be of various data types, including, but not limited to: String, Long, Double, Date, Boolean, Object, or File. Attribute are declared as input or output values (or both at once) to indicate if the module uses the attribute value as an input or outputs a value for the attribute. Attribute values can also be declared as trigger values.

According to one embodiment, any trigger declared for a module is only used as a trigger if it is referenced in the process 307. Referenced trigger values can be initialized with data before the module processes the task with which the values are associated. Production attribute values can be associated with a particular node level.

Different classes of modules may declare different types of production attributes. For example:

Task creation modules: The first module in a process that creates batches from a specified process and starts a document capture job. Typically, task creation modules can also open existing batches when necessary. Examples of creation modules include input modules 320 (e.g., scan modules, web services input modules, file system import modules, email import modules or other modules). According to one embodiment, these modules may, in some circumstances, not use input attribute values because they do not receive tasks from other modules. However, task creation modules use output attributes for storing data captured during batch processing and statistical data about the batch processing.

Task processing modules: Task processing modules accept tasks from other modules, perform an operation on the data in the tasks, and then send the tasks to other modules. According to one embodiment, task processing modules wait for any task from any batch or open a specific batch to process its tasks. These modules may use input attributes to obtain data from other modules and output attributes to make data available to other modules after the module completes its processing.

Delivery/output modules: Delivery modules obtain the results of document capture jobs and export them into longer-term storage solutions. Depending on the export module, the destination for exported data can be a file system, a batch, or a third-party repository. Modules designed to export directly into a repository can map attribute values to the object model of the target system. Images and data files, statistical data, index values, and bar code values can be mapped to the appropriate objects.

According to one embodiment, capture system 302 maintains data to coordinate capture jobs. For example, in one embodiment, capture system 302 maintains batch files and stage files in a local or external file system or database (for example, repository 330). A batch file contains the batch tree structure and attribute values for a batch being processed. As batches are processed, attribute values can be updated by capture system 302 with the value data generated by each module.

Stage files store captured data. According to one embodiment, a module is configured to send one or more data files to the server for each page scanned or imported In addition or in the alternative, a module is configured send the one or more data files to the next assigned module in a flow. Thus, in some embodiments, a module may send data files to the next module without the data files going to the server between modules.

A page is defined as a single-sided image. When a physical sheet of paper is scanned in duplex mode, it results in two pages (one for each side). According to one embodiment, one stage file is created for each page scanned or imported. However, some modules create multiple files per page. The type of file in which page data is stored varies depending on the module. Each stage file can be associated with a node and named with the unique node ID. Stage files may also be stored in a manner that identifies the stage at which the file was generated. For example, if a scan input module 320*a* is the first module, image files that the scan module 320*a* sends to the capture system 302 are stored with the file extension 1. Stage files from the next module are stored with the file extension 2. Files created by the next module would then be saved with the file extension 3. If the input device outputs multiple streams (for example, a multi-stream scanner that outputs a binary and color image for each page scanned), then each stream can be treated as a stage according to one embodiment. In this example, two sequential file extensions such as 1 and 2 could belong to the same step.

The following example Table 1 illustrates a sample record structure maintained by capture system 302 for a node (page) with ID 23e in a simple linear process consisting of three modules.

TABLE 1

| Module | Attribute Name | Value Data |
| --- | --- | --- |
| Scan Module | OutputImage | <ca: 9c-23e-1 |
| Image Processor | InputImage | <ca: 9c-23e-1 |
|  | OutputImage | <ca: 9c-23e-2 |
| Completion | Image | <ca: 9c-23e-2 |

The value data <ca:9c-23e-1 is interpreted as follows:
a. <: Designates a stage file.
b. ca: Identifies a server communication session.
c. 9c: The batch ID.
d. 23e: The node ID.
e. 1: The stage number.

As can be noted from Table 1, the data value for the InputImage attribute of the image processor module in the example flow is the same as the data value of OutputImage attribute from the scan module. This represents an example in which, according to process 307, the output image stage file from the scan module was used as the input image to the image processor module.

As noted above, capture system 302 may process a capture process 307 that defines the processing steps for processing document images, the order in which the steps are applied and what to do with the resulting images and data. The process may provide an order in which modules are to process the tasks, setup attribute values, trigger values, processing instructions and other information used to configure system 300 to process a batch.

Figure 4:
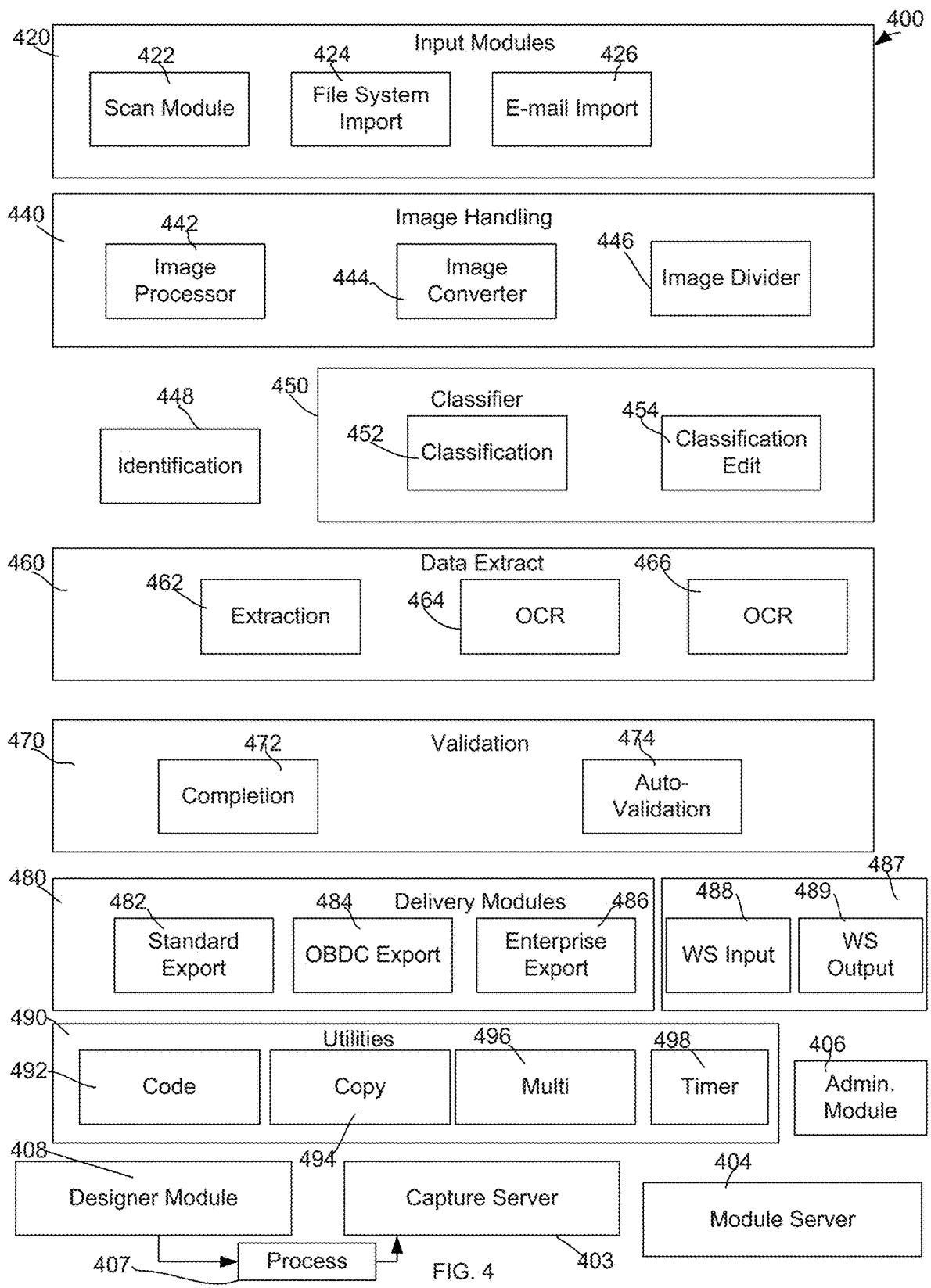
FIG. 4 is a diagrammatic representation of one embodiment of components of a document capture platform.

FIG. 4 is a diagrammatic representation of one embodiment of components of a document capture platform 400 that may be implemented in a document processing system, such as document processing system 300. Components of platform 400 may be embodied as computer instructions stored on a non-transitory computer readable medium. The components may execute on one or more host machines and, in some embodiments, multiple instances of a single component may be executed on the same host machine in parallel.

In the illustrated embodiment, components include a capture server 403, a module server 404, an administration module 406, a designer module 408, and production modules including input modules 420, image handling modules 440, identification modules 448, classifier modules 450, extract modules 460, validation modules 470 delivery modules 480, web services modules 487 and utilities 490. The modules comprise executable code. For example, each module may be an EXE module (an application) that can be launched in the operating system of a host machine or a DLL module that can be hosted by a program at a host machine.

The components of platform 400 may run on a single host machine or be distributed on multiple host machines. Capture server 403 executes on a capture server host machine (a capture server machine) and each production module, administration module 406 and designer module 408 executes on a client host machine (client machine). Module server 404 executes on a module server host machine (module server machine) and hosts one or more production modules or provides access to one or more production modules as services. The module server machine may thus be considered a particular type of client machine. In some embodiments, a capture system, such as capture system 302, may comprise one or more capture server machines and one or more module server machines. In some cases, a single host machine may be both a capture server machine and a client machine. Multiple production modules can run on a single client machine, or each can run on a different machine or be otherwise distributed on client machines. In some cases, multiple copies of a production module may run on multiple machines. In other embodiments, multiple instances of the same production module may run in parallel on the same host machine. The components of capture platform 400 may communicate using suitable protocols. For example, according to one embodiment, the components may use TCP/IP to communicate.

Capture server 403, according to one embodiment, is an open integration platform that manages and controls the document capture process by routing document pages and processing instructions to production modules. In particular, capture server 403 ingests a compiled process 407 which comprises instructions for directing capture server 403 to route images and data to the appropriate production modules in a specific order. Compiled process 407 may further comprise processing instructions that are implemented by capture server 403 or forwarded by capture server 403 to the appropriate production module.

The production modules are software programs that perform specific information capture tasks such as scanning pages, enhancing images, and exporting data. Production modules may run remotely from capture server 403 component. Some production modules, referred to as "operator tools", may require operator input to complete the module processing step specified in the compiled capture process 407 being implemented. Other production modules, referred to as "unattended modules", are configured to automatically receive and process tasks from capture server 403 without requiring operator intervention to complete the module processing step specified by the compiled capture process 407 being implemented. Module server 404 can make various production modules available as services.

Input modules 420 comprise modules that are configured to capture documents from a variety of sources. Input modules 420 can create batches from scanned documents, files imported from directories, emails and attachments imported from email servers or documents imported from other sources. Example input modules comprise a scan module 422, file system import module 424 and email import module 426.

Scan modules 422 are production modules configured to create batches and import pages into the batch, automatically creating a batch hierarchy based on detected scanning events. A scan module 422 may support various scanner drivers. In one embodiment, a scan module can use the Image and Scan Driver Set by Pixel Translations of San Jose, Calif., which is an industry standard interface for high performance scanners. Scan modules 422 may provide a user interface that allows operators to create batches and scan or import pages into them, automatically creating a batch hierarchy based on detected scanning events.

File system import modules 424 are configured to watch a directory for new files. When a new file is detected in a specified directory, the file system import module 424 watching the directory creates a new batch based on the process 407. A file system import module 424 may run at intervals as needed. When a module 424 runs, the module 424 imports files found in a watched directory into one or more batches until all the files (or some defined subset thereof) are imported. A module 424 may be configured to locate files in subdirectories. When a file has been successfully imported, the module 424 can remove the file from the watched directory. File system import modules 424 may run unattended as services on a client machines.

E-mail import modules 426 receive documents in the form of e-mail and attachments from mail servers. An e-mail import module 426 is configured to parse an incoming e-mail into parts enabling the various parts of the e-mail message (message body and attachments) to be imported as separated items.

Image handling modules 440 comprise modules configured to enhance, manipulate, and add annotation data to images. Image processor modules 442 are configured to apply image filters to detect content, remove distractions such as holes or lines, adjust colors, improve line quality, and correct page properties using, for example, image processing profiles. Examples of image processing filters include, but are not limited to detection filters, removal filters, color adjustment filters, image quality filters and page correction filters. Detection filters comprise filters to detect features in images, such as barcodes, blank pages, color marks, colorfulness, patch codes. Removal filters comprise filters to remove selected features in an image such as background, black bars, holes and lines. Color adjustment filters comprise filters to adjust overall color, convert specific colors, convert to black and white and invert colors. Page correction filters comprise filters configured to adjust the page, such as filters to crop, deskew, rotate and scale page images.

Image converter modules 444 are configured to convert image files from one format to another. Image converter modules 444 can be configured implement a variety of conversions, including, for example:
changing image properties including file format, color format and compression;
converting non-image files from a variety of formats to images and PDF files;
converting image files to PDF files;
generating output files of specific file types such as, for example, PDF, TIFF, BMP and other file types;
merging single-page files into multi-page documents;
splitting multi-page documents into single pages;
merging annotations added to images by other modules;
generating thumbnails of pages processed.

Image divider modules 446 are configured to acquire, identify and process multi-page image files. When an image divider module 446 identifies an incoming file as a multi-page image file, the image divider module 446 can split the file into single-page files while preserving the attributes of the original image file.

Identification modules 448 enable operators to assemble documents, classify document pages to page templates, verify and edit values in pre-index fields, check and edit images, flag issues, and annotate pages.

Classifier modules 450 classify documents based on document type. According to one embodiment, classification modules 452 are configured to classify documents automatically by assigning each document to a template (e.g., such as a data entry form as discussed in conjunction with FIG. 3 or other template). Documents that cannot be classified automatically by matching them to templates can be sent to a classification edit module 454.

A classification module 452 may comprise a classification engine that classifies documents using one or more techniques, including, but not limited to:
Full page image analysis: Evaluates and compares an entire image to models stored in each template.
Handwritten detection analysis: Evaluates images to determine the percentage of handwriting they contain. If higher than a predefined threshold, an image is classified as "handwritten".
Full text analysis: performs OCR and evaluates the resulting text for keywords, pattern matches, or regular expressions that were defined in a template.
High precision anchors: selects a feature of an image based on a similar feature that was demarcated on a model image stored in a template.

Classification edit modules 454 enable operators to manually classify documents that were not classified automatically by a classification module 452. Operators can classify documents by assigning each document to a template. According to one embodiment, classification edit modules 454 are operator modules that operators interact with to successfully process documents. Batches selected for processing during production may open automatically in an interface provided by a classification edit module 454. The interface can provide a window where an operator can complete and correct automatic classification that was performed classification module 452.

Data extract modules 460 are production modules configured to extract data from page images. Extraction modules 462 extract data from each page of a document and combines page-level outputs into a single document. According to one embodiment, extraction modules 462 extract field data into a document object. An extraction module 462 may use multiple techniques to extract data. By way of example, but not limitation, an extraction module 462 can use zonal recognition to extract data from predefined areas of page and free form recognition to extract data from an entire page. An extraction module 462 may include a recognition engine configured to recognize machine print, hand print, checkboxes 1D barcodes, 2D barcodes, signatures (present or not), checks or other features.

Platform 400 may include OCR modules 464. An OCR module 464 can be configured to use one or more OCR engines to perform OCR on images in various formats. Platform 400 can further include OMR modules 466. OMR modules 466 can be configured to recognize optical markings.

Validation modules 470 include modules to validate extracted data. For example, completion modules 472 enable operators to assemble documents, index and validate data, check and edit images, and flag issues. The user interface components that operators see in validation view are determined during module setup and in global configuration options. Document types created in the capture system can determine the appearance and behavior of the data entry form that operators use for indexing and validation. Upon launching a completion module 472, an operator can choose work from the list of batches available for processing. After getting either a single batch or multiple batches, the operator can cycle through each document until all work items have been processed. The types of work items to be addressed for each piece of work may be determined by completion module 472 settings. Platform 400 may further include auto-validation modules 474 configured to validate data against external data or data from other data sources.

Utilities 490 comprise custom code modules 492, copy modules 494, multi modules 496 and timer modules 498. Custom code modules 492 comprise custom code that can be run as an independent step within a process 407. A custom code step can be added to the process like any other module step.

As one example, a code module 492 may provide a Microsoft .NET Framework programming interface or other programming interface that can be used to read and write batch data. A developer accesses this interface by creating a .NET assembly (DLL file) or other appropriate code. The code module's programming environment may also provide access to built-in interfaces. For example, a .NET Code module's programming environment also provides access to built-in .NET Framework interfaces.

A copy module 494 can be configured to automatically copy batches to another capture system, to a local or network directory, to an FTP site or to another destination.

A multi module 496 can allow processes to manipulate the batch tree (e.g., by inserting or deleting nodes) change trigger levels in a process (discussed below) and perform other operations.

A timer module 498 can be configured to trigger other modules to start processing tasks from specified batches at a particular time. During setup, rules are created to specify the conditions under which a timer triggers other modules and the operations the timer module 498 performs during production.

Delivery modules 480 include modules configured to output data to specified destinations. In the illustrated embodiment, delivery modules include standard export modules 482, OBDC export modules 484 and enterprise export modules 486.

Standard export modules 482 can be configured to exports content to emails (HTML/text) and files (CSV, XML, free text, and data file). A single export step can define the batch data to export, the format for the batch data, and the location where the batch data is written. ODBC export modules 484 can be configured to store image data and related values to databases.

Enterprise export modules 486 can be configured to export images and values to enterprise content management system. According to one embodiment, an enterprise export module 486 can be configured to export documents to new or existing objects in the enterprise content management system.

Platform 400 can further include web services (WS) modules 487. WS modules 487 include WS input modules 488 and WS output modules 489. WS input modules function as web service providers, processing requests form external web services consumers. A step of a WS input module 488 can be configured at the beginning or in the middle of a process. When used at the beginning of a process, a WS input module 488 creates new batches as it receives web service requests from external systems. When used in the middle of a process, a module 488 can insert data and files into an existing batch. A WS input module 488 can provide mapping for simple parameters (single values, structures, and arrays) and client-side scripting capabilities to enable processing of more complex parameters.

WS output module 489 serves as a web services consumer, using Internet protocols to access the functionality of external web services providers. A WS output step, if configured, is configured at or near the end of a process, enabling the module to export data that has been processed by other modules. By using a WS output module 489, images, files, and metadata can be extracted from the document capture system to any web-service enabled, third-party system without writing a custom export module.

Administration module 406 is a tool that enables administrators to manage batches, users, processes, licensing, and reports. An administrator can use an administration module 406 to monitor, configure, and control a capture system. An administrator can view and configure aspects of the system relating to, for example:

CaptureFlow definitions (process definitions)
  Batch data (in real time as it is processed)
  User departments, roles, and permissions
  Servers and server groups (for clustered implementations)
  Web services configurations
  Licensing In particular, according to one embodiment, a particular installation of platform 400 may be limited in the types and number of instances of modules that can be run based on licensing. Administration module 406 can reconfigure an installed platform 400 to change the types and number of instances permitted.

Designer module 408 provides a centralized development tool for creating, configuring, deploying, and testing the capture system end-to-end. This tool can serve as single point of setup for process design tasks and enables access to capture process design tools. Designer module 408 may include a number tools to enable a variety of design activities such as, for example:

Image Processing: Create profiles with filters that enhance image quality, detect image properties such as barcodes or blank pages, make page corrections such as deskewing and rotating, add and edit annotations on images.
  Image Conversion: Create profiles that specify image properties including file format, color format, and compression to convert non-image files to images and images to non-images (for example, TIFF to PDF), merge and split documents and merge annotations added to TIFF images by other modules into the output image.
  Recognition: Create recognition projects that identify the templates, base images, and rules for classifying documents.
  Document Types: Create a document type for each paper form and associate it with a recognition project. The document type defines the data entry form that the Completion module operators use for indexing and validation. Document type definition can include defining fields and controls, a layout, a set of validation rules, and document and field properties.
  Export: Create profiles that specify how data should be exported for capture processes.
  Capture Flow Designer: Create and design new capture processes. Each process can comprise a detailed set of instructions directing the capture server 305 to route images and data to the appropriate production modules in a specific order.

The designer module 408 can comprise a capture flow compiler ("CF compiler") configured to output a capture process 407 to implement a capture flow.

According to one embodiment, a process 407 may provide instructions for processing documents in batches. A module may process all of the batch data at once or the batch data may be separated into smaller work units, for example as discussed above with respect to FIG. 3. According to one embodiment, capture server 403 controls batch processing, forms the tasks, queues tasks (e.g., on the capture server machine) and routes them to available production modules based on the instructions contained in the process 407. Capture server 403 can monitor the production modules and send them tasks from open batches (for example, when a production module has space in a task queue). If multiple machines are running the same production module, the server can apply rules to send the task to a particular instance. The state of a task is manipulated by capture server 403 as well as by the production modules that process it.

When a production module completes a task, it returns the task to the server 403 and starts processing the next task from a task queue located on the module client machine. When the capture server 403 receives the finished task, it includes the batch node of that task in a new task to be sent to the next module as specified in the process 407. Capture server 403 also sends a new task to the module that finished the task if there are additional tasks to be processed by that module. If no production modules are available to process the task, then the server queues the task until a module becomes available. According to one embodiment, server 403 and the production modules work on a "push" basis.

Each task for a process 407 may be self-contained so modules can process tasks from any batch in any order. According to one embodiment, the capture server 403 tracks each task in a batch and saves the data generated during each step of processing. This asynchronous task processing means that the modules can process tasks as soon they become available, which minimizes idle time.

Attributes may be used store data and pass data from module to module as discussed in conjunction with FIG. 3. Capture server 403 may maintain data to coordinate capture jobs. For example, in one embodiment, capture server 403 maintains batch files and stage files in a local or external file system or database. As batches are processed, attribute data values are updated by capture server 403 with the value data generated by each module.

Figure 5:
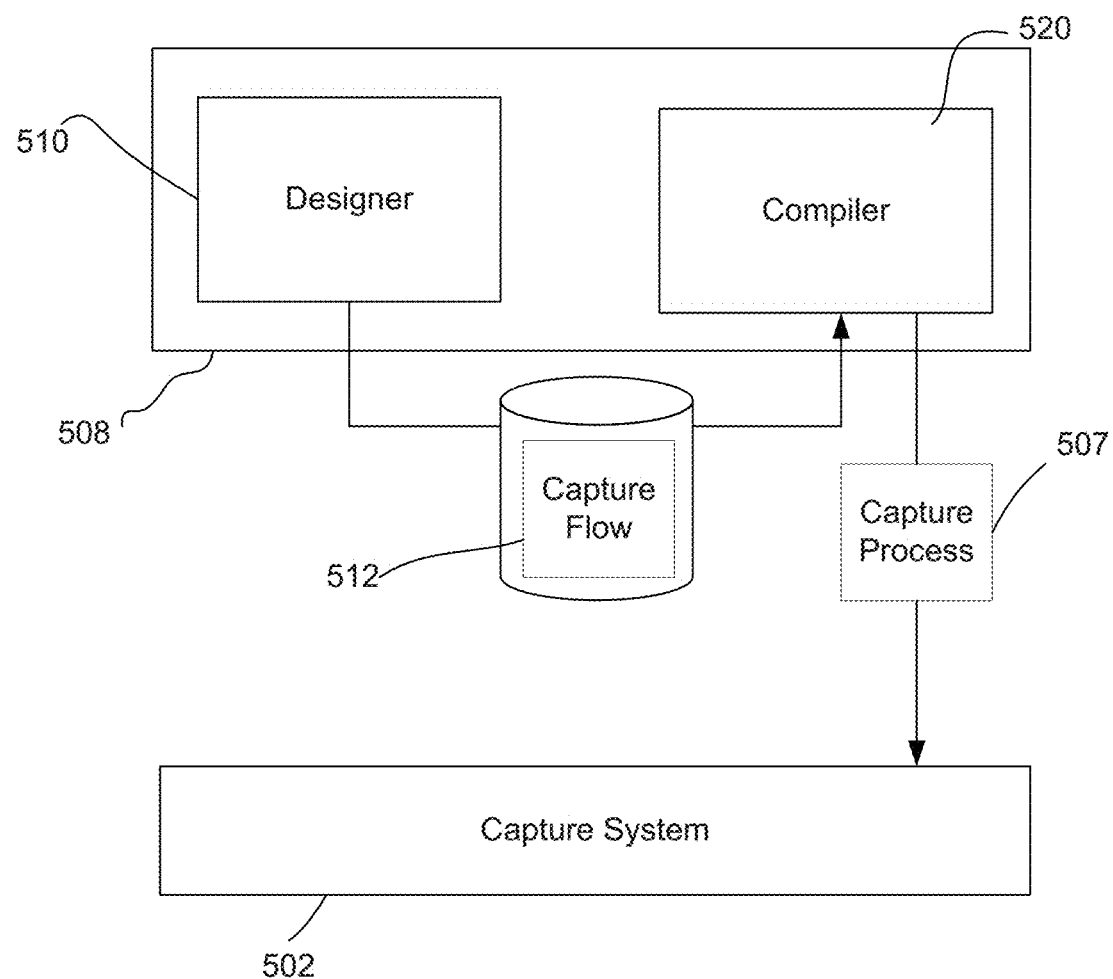
FIG. 5 is a diagrammatic representation of one embodiment of a system for designing and deploying a capture process.

FIG. 5 is a diagrammatic representation of one embodiment of a system for designing and deploying a capture process. The system of FIG. 5 comprises a capture system 502, such as capture system 302 or a system implementing platform 400, and a process design tool 508. Process design tool may execute on a client machine or server machine and can be an example of process design tool 308 or design module 408. Process design tool comprises a capture flow design tool 510 that allows a designer to define a capture flow 512. When the designer is satisfied with the design, a capture flow compiler 520 compiles the capture flow into a capture process 507 that is provided to a capture system 502. Capture process 507 may further comprise processing instructions that are implemented by capture system 502 to implement the capture flow.

According to one embodiment, capture system 502 may comprise an Open Text® Captiva® Capture server and design tool 508 comprises the Open Text® Captiva® Designer with a capture flow compiler ("CF compiler") configured to output capture processes as XPP files and adapted to operate as described herein.

Figure 6:
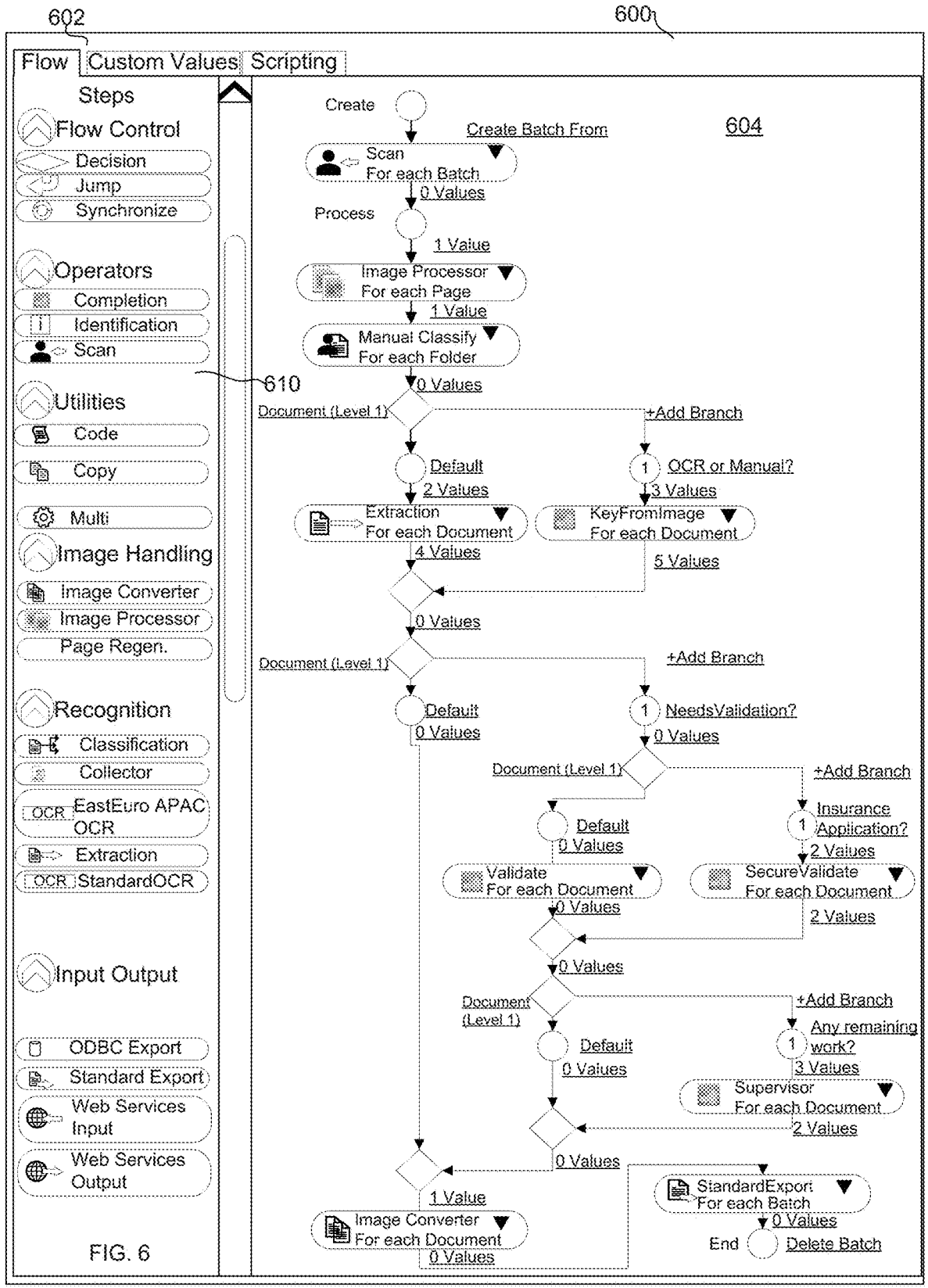
FIG. 6 illustrates one embodiment of an interface for designing a capture flow.

FIG. 6 illustrates one embodiment of an interface 600 provided by a process design tool for designing a capture flow. Interface 600 includes capture flow designer tabs 602 that can be used to display a capture flow design interface (shown), a custom values interface to allow a designer to enter custom values and a scripting interface with an embedded script editor that allows the designer to design custom scripts.

The capture flow design interface includes a design area (also referred to as a canvas) 604 and a steps panel 610. Steps panel 610 correspond to configurable processing steps of a capture process. According to one embodiment, steps panel 610 includes steps primitives corresponding to units of executable code (for example, executables or libraries) or other configurable code components installed in a document processing system.

To build a capture flow, the designer drags primitives from the steps panel 610 on the left, onto the canvas 604 on the right, somewhere between the Process and End primitives to define the steps of the capture flow. The capture flow steps can be renamed. In addition to naming the steps, the designer can indicate at what level each step processes, for example, by right-clicking each step and choosing the level option. For example, a scan step can be configured to scan and send documents to a server in batches. An image handling code unit can be applied to each page in the batch. Indexing (automatic or manual classification) can be configured to occur on a per-document basis.

Primitives from step panels 610 can be dragged onto canvas 604 to create a sequence of steps that correspond to configurable code components (e.g., production modules or other code components). The designer can link steps to represent the flow of processing between code components. The designer may include capture flow decisions having default and conditional branches and specify the conditions for selecting a conditional branch.

Figure 7A:
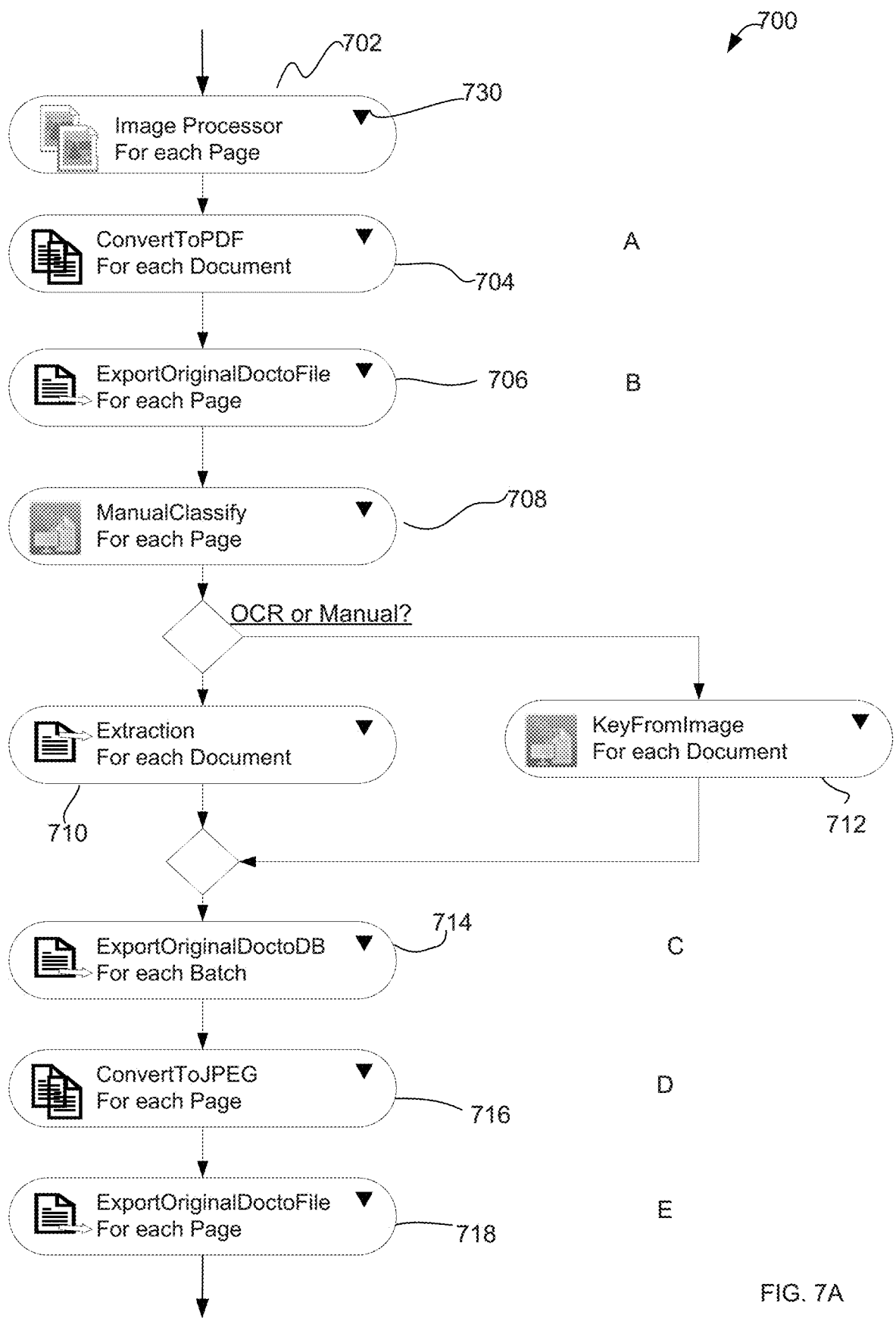
FIG. 7A illustrates one embodiment of a portion of an original capture flow.

FIG. 7A illustrates one embodiment of a portion of an original capture flow 700 that can be designed in a process design tool. By dropping primitives onto a canvas, the designer creates a capture flow 700 having a sequence of steps. By arranging, linking, and configuring the steps, the designer defines a sequence in which executing codes components will process a document image (or batch of images). According to one embodiment, each capture flow step 702-718 represents a configuration of an identifiable unit of code of a document processing system (such as modules of FIG. 3 or FIG. 4).

For example, by linking image processor step 702 to ConvertToPDF step 704, the capture flow 700 defines that a corresponding image processor code component (for example, a first image handling module 340 of FIG. 3 or image processor module 442 of FIG. 4) will process image files and then the image files will be routed to a ConvertToPDF code component (for example, a second image handling module 340 of FIG. 3 or an image converter module 444 of FIG. 4) for further processing. During execution of a capture process compiled from the capture flow, multiple instances of a module may implement a step (e.g., multiple instances of an image converter module configured according to step 704 may be executed to implement the step).

The designer may also assign what data (e.g., images, attributes or other data) is passed from one step to the next in a capture flow to connect code components. In some embodiments, the process design tool may automatically make at least some of these assignments. For example, when the designer inserts ConvertToPDF step 704 after ImageProcessor step 702, the process design tool can automatically set ConvertToPDF:

0.ImageInput=ImageProcessor0.ImageOutput. Further, the designer may select the trigger level for a step. For example, in FIG. 7A, the designer has selected that ConvertToPDF works on documents (e.g., a trigger level of 1). This indicates that the document capture system (e.g., document capture system 302) should not trigger a corresponding ConvertToPDF code component to process data for a document until the ImageProcessor code component has provided ImageOutput data values for each page in a document.

The design tool interface can provide tools for configuring the steps. For example, by selecting arrow 730, the designer may be presented with an interface that allows the designer to configure attributes (for example identify input attributes, create custom attributes, identify output attributes, provide step configuration or setup values for attributes) or otherwise provide other information for configuring code elements.

Despite the fact that design tools such as Open Text® Captiva® Designer provide a convenient interface for designing capture flow, a capture flows may still contain inefficiencies. In FIG. 7A, for example, step 706 was accidentally duplicated as step 718. In more complex capture flow examples, particularly where the number of operations exceeds single screen on designer's monitor, such inefficiencies are more likely. The fact that several operators in parallel might edit a capture flow complicates the task.

In addition to inefficiencies due to duplication, other inefficiencies may arise from the ordering of steps. In the example of FIG. 7A, steps 704, 706, 714, 716 and 718 are independent, meaning that, in the group of steps, the input of each step is not dependent on the output of any other step in the group, but may be dependent on the output a step prior to each member of the group (e.g., the output of step 702), yet the arrangement of FIG. 7A indicates that these steps will be executed sequentially. Assume $t_A$, $t_B$ $t_C$ $t_D$ $t_E$ are the delays caused by executing code corresponding to steps 704, 706, 714, 716 and 718 while processing the single page. In many cases, millions of pages per year must be processed, so overall delay caused by this flow will be $>(t_A+t_B+t_C+t_D+t_E)*10^6$.

Embodiments described herein may eliminate or reduce inefficiencies in a capture flow. Returning to FIG. 5, a capture flow (CF) compiler 520 provides an automated tool which applies programming language compilation logics to an original capture flow 512 (e.g., a capture flow received from a capture flow designer 510) to reorder operations and optimize an original capture flow 512. In particular, the CF compiler will perform the operation reordering and optimization of the original capture flow 512. For example, CF compiler 520 can perform instruction rescheduling. In one embodiment, CF compiler 520 is configured respect certain dependencies in the original capture flow based on inputs and outputs of each step. Example capture flow optimization rules include, but are not limited to:

Read after Write ("True"): Step 1 outputs a value used later by Step 2. Step 1 must come first.

Write after Read ("Anti"): Step 1 inputs an attribute value that is later output by Step 2. Step 1 must come first, or it will input the new value instead of the old.

Write after Write ("Output"): Two steps both output data values for the same attribute. Steps must occur in their original order.

Figure 7B:
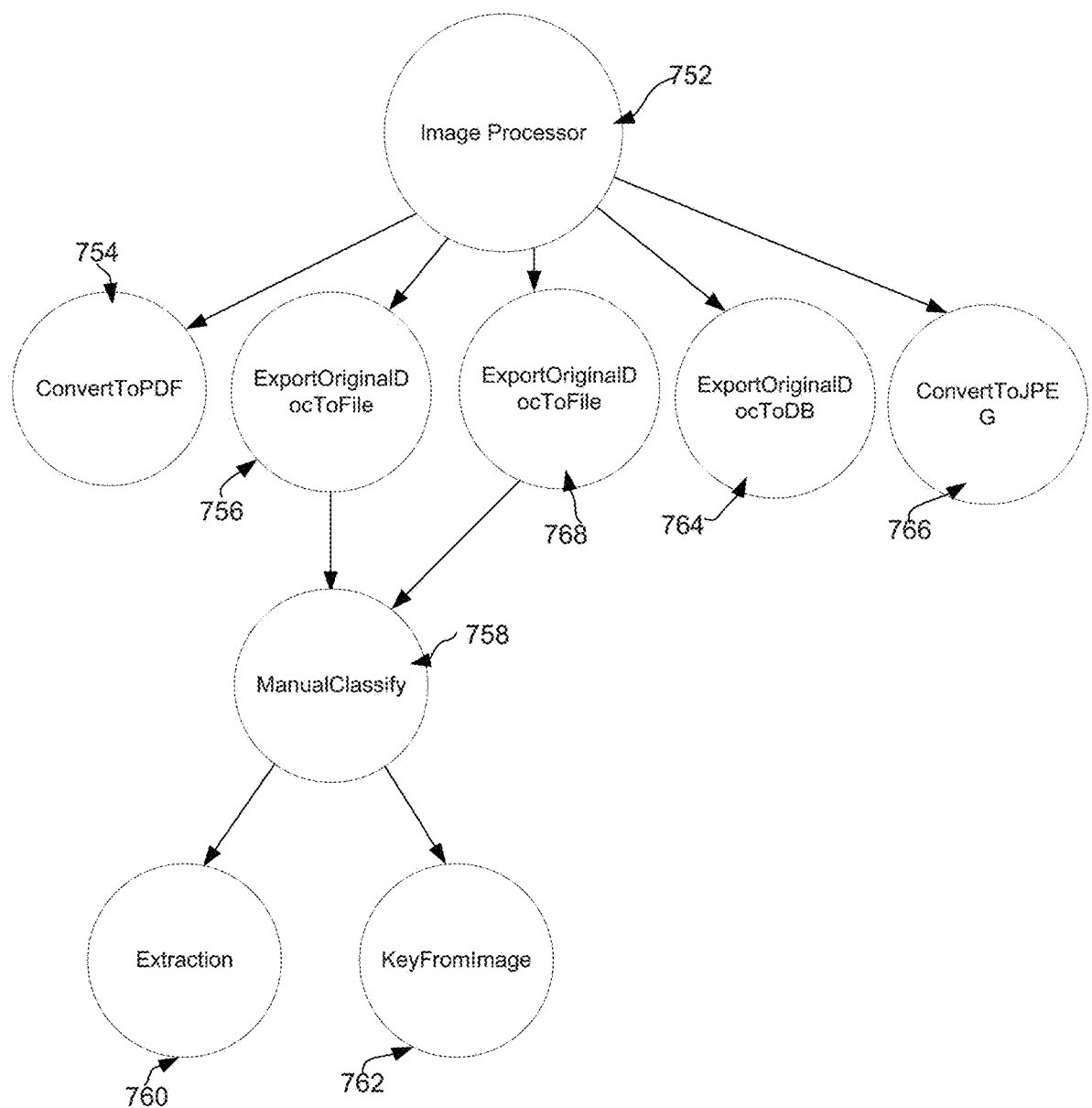
FIG. 7B illustrates one embodiment of a graph representing the original capture flow.

To respect these dependencies, the CF compiler 520 can create a directed graph where each vertex is an instruction and there is an edge from Step 1 to Step 2 if Step 1 must come before Step 2 based on the above-referenced rules. The order of graph vertices and the edges can be determined based on the input and output attributes specified in the original capture flow. FIG. 7B represents a graph for the portion of an original capture flow illustrated in FIG. 7A. Node 752 represents step 702, node 754 represents step 704, node 756 represents step 706, node 758 represents step 708, node 760 represents step 710, node 762 represents step 712, node 764 represents step 714, node 766 represents step 716, node 768 represents step 718.

Figure 7C:
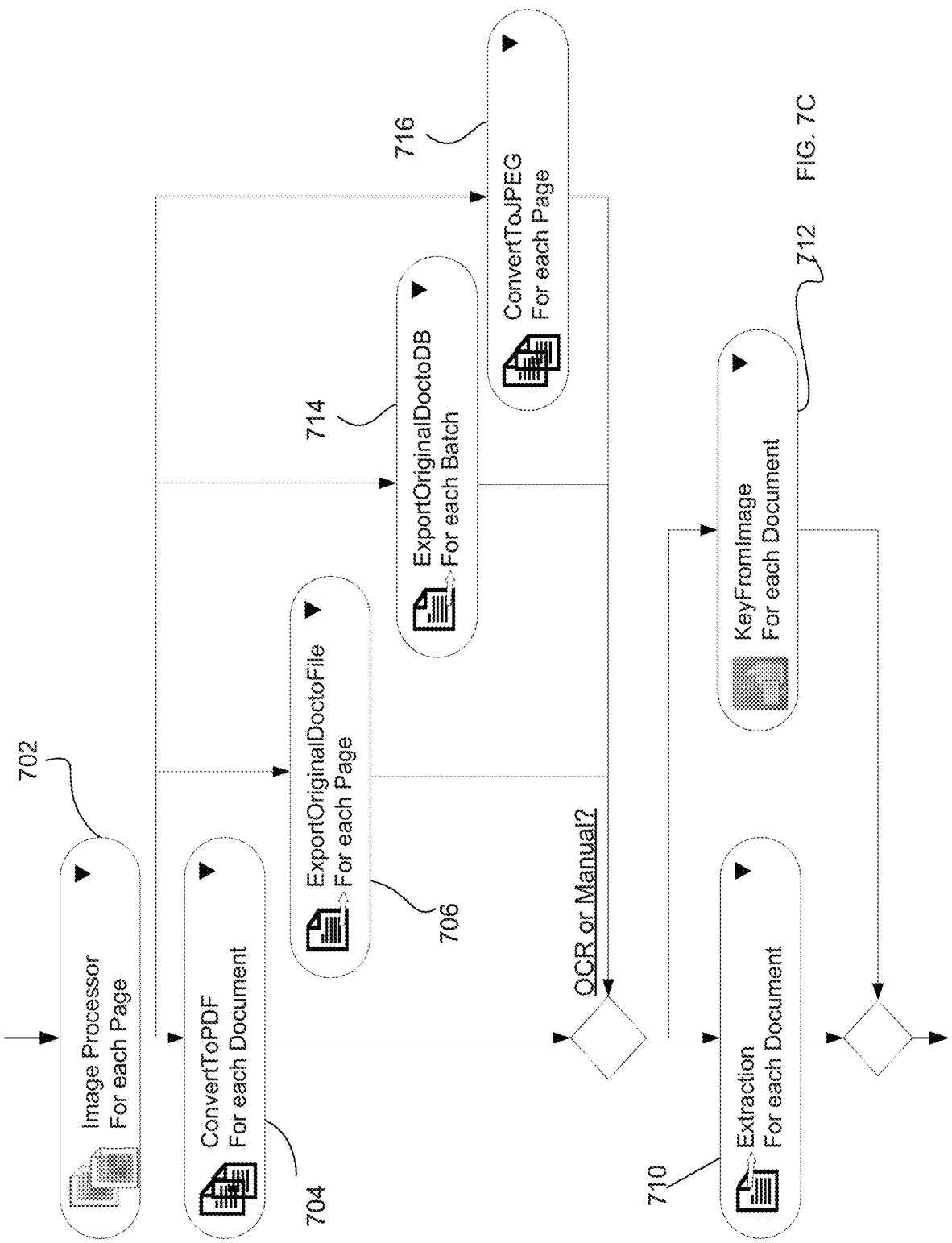
FIG. 7C illustrates on example of an optimized capture flow.

If a first step and a second step are of the same type and have identical input attributes and output attributes, the steps can be considered duplicates and one of them eliminated. For example, because nodes 756 and 758 are identical, one of the duplicative steps, say step 718, can be eliminated from the capture flow. Furthermore, steps that occur at the same depth of the directed graph can be reordered for parallel execution. FIG. 7C, for example, represents an example of how an optimized flow might look. The duplicated steps are eliminated, and the independent steps are parallelized. As such, the duration of the execution of 704, 706, 714, 716 and 718 is limited by the duration of the longest module from 704, 706, 714, 716. CF compiler 520 can compile a capture process 507 based on the optimized capture flow. Thus, if the computing environment has enough processing power, parallelization of the steps may improve the overall throughput. It can be noted, however, that even though steps may be compiled for parallel execution, the capture system may execute parallelized steps in sequence based on the availability of modules, memory, processing power or other runtime factors.

In one embodiment, CF compiler 520 is an ahead-of-time compiler and performs CF optimization work before execution begins. In another embodiment, CF compiler 520 is a just-in-time (JIT) compiler that executes on a capture system (capture system 502) and compiles a capture process 507 when an operator requests to run a process on a batch.

CF Compiler 520 may also gather statistics as document capture system 502 executes a process 507, and use pattern matching and machine learning algorithms in an optimization process.

Figure 8:
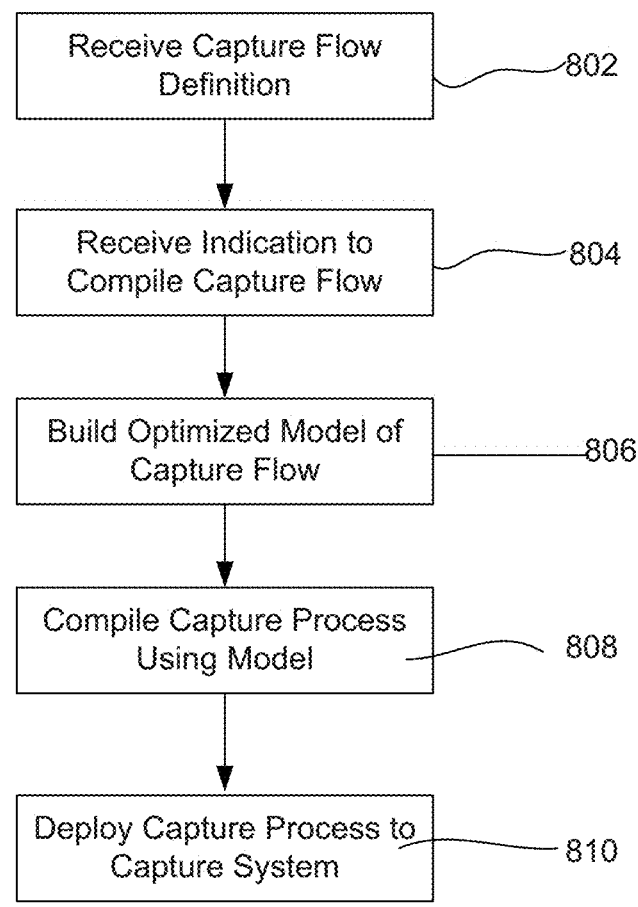
FIG. 8 illustrates one embodiment of a method for processing a capture flow.

FIG. 8 is a flow chart illustrating one embodiment of a method for processing a capture flow. According to one embodiment, a process design tool receives a capture flow comprising a series of steps with each step comprising a configuration of an identifiable portion of executable code (step 802). The received capture flow includes an indication of an order of the steps and of the connections between steps (e.g., the input and output attributes of each steps). The process design tool receives an indication to compile the capture flow (step 804). The capture flow compiler can build an in-memory model of the capture flow, such as directed graph, with steps as vertices and links between the steps as edges (step 806). The directed model may be built on rules, such as instruction scheduling rules. The capture flow compiler can compile the capture flow into a capture process based on the model (step 808). In compiling the capture process, the capture flow compiler can identify duplicative steps from the capture flow and eliminate the duplicative steps. The capture flow compiler can further identify groups of independent steps and compile the steps in the group as parallel steps. In one embodiment, the capture flow compiler identifies steps occurring at the same depth of a directed graph model as independent steps. The compiled capture flow provides instructions for a document capture system including an order in which modules are to process the tasks, setup attribute values, trigger values, processing instructions for steps. The process design tool can deploy the compiled process to a capture system in a format that is usable by the capture system to implement the process (step 810).

Figure 9:
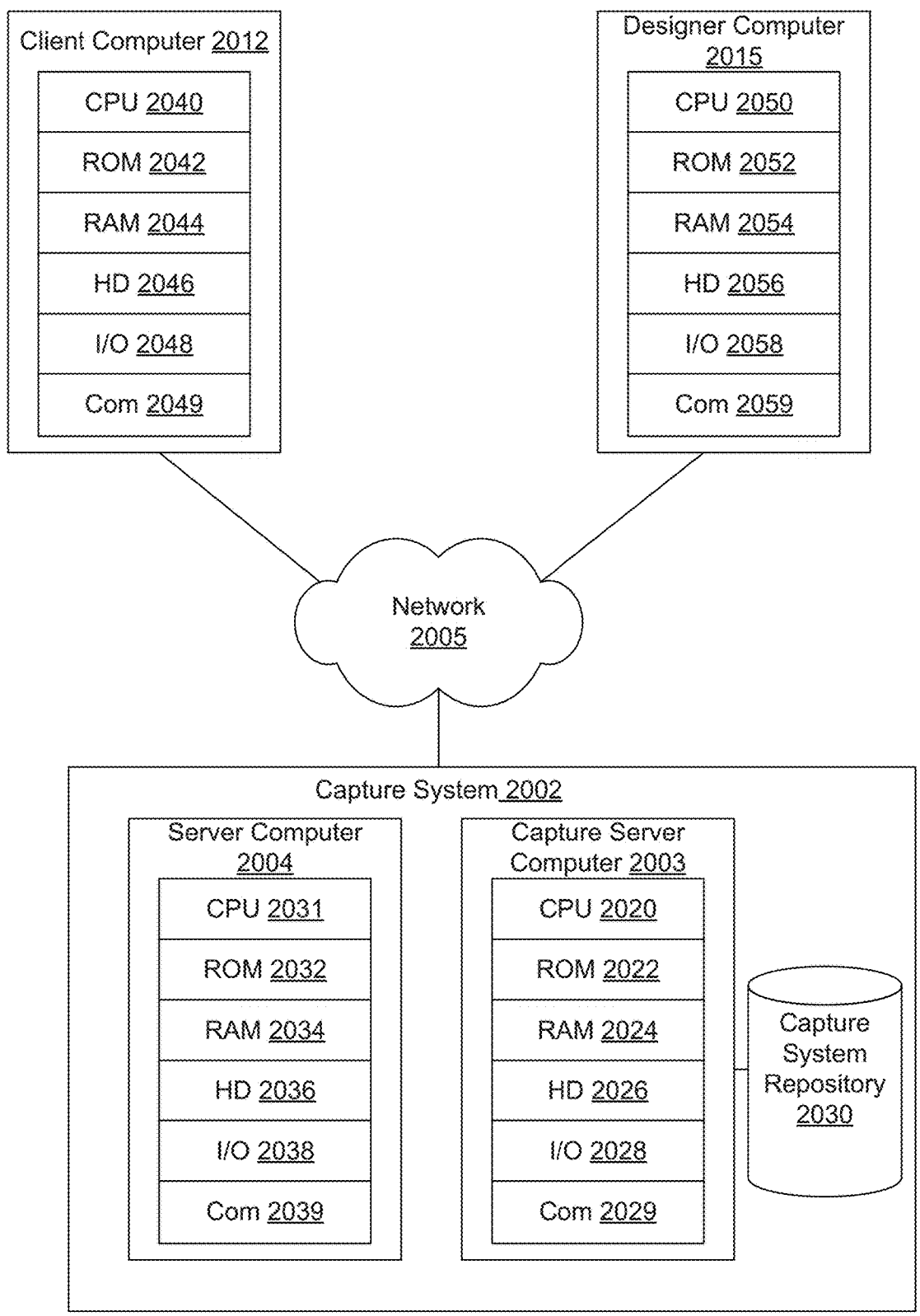
FIG. 9 is a diagrammatic representation of one embodiment of a distributed network computing environment.

FIG. 9 depicts a diagrammatic representation of a distributed network computing environment where embodiments disclosed herein can be implemented. In the example illustrated, network computing environment 2000 includes network 2005 that can be bi-directionally coupled to client computer 2012, designer computer 2015 and capture system 2002. Capture system 2002 comprises a capture server computer 2003 and a module server computer 2004. Computer 2003 can be bi-directionally coupled to data store 2030. Network 2005 may represent a combination of wired and wireless networks that network computing environment 2000 may utilize for various types of network communications known to those skilled in the art. In one embodiment, computer 2012 may capture images and provide the images to capture system 2002, which recognizes and extracts information from the images as discussed above. The information extracted from the images may be classified and otherwise interpreted and provided to backend systems.

For the purpose of illustration, a single system is shown for each of computer 2003, 2004, 2012 and computer 2015. However, with each of computer 2003, 2004, 2012 and 2015, a plurality of computers (not shown) may be interconnected to each other over network 2005. For example, a plurality of computers 2003, a plurality of computers 2004, a plurality of computers 2012 and a plurality of computers 2015 may be coupled to network 2005. Computers 2012 may include data processing systems for communicating with computer 2003 and/or 2004. Computers 2015 may include data processing systems for individuals whose jobs may require them to design capture processes implemented by capture system 2002.

Capture server computer 2003 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005. Computer 2004 may be similar to computer 2003 and can comprise CPU 2031, ROM 2032, RAM 2034, HD 2036, I/O 2038 and communications interface 2039. Computers 2003, 2004 may include one or more backend systems configured for providing a variety of services to computers 2012 over network 2005. These services may utilize data stored in data store 2030. According to one embodiment, server computer 2003 runs a capture server and computer 2004 runs a module server hosting at least one production module, a monitoring module, a capture flow advisor and an integrated process advisor.

Computer 2012 can comprise CPU 2040, ROM 2042, RAM 2044, HD 2046, I/O 2048 and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058 and communications interface 2059. According to one embodiment, client computer 2012 runs at least one production module, such as an input module, and designer computer 2015 runs a process design tool.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 2003, 2004, 2012 and 2015 is an example of a data processing system. ROM 2022, 2032, 2042, and 2052; RAM 2024, 2034, 2044 and 2054; HD 2026, 2036, 2046 and 2056; and data store 2030 can include media that can be read by CPU 2020, 2030, 2050, or 2060. Therefore, these types of memories include non-transitory computer-readable storage media. These memories may be internal or external to computers 2003, 2004, 2012, or 2015.

Portions of the methods described herein may be implemented in suitable software code that may reside within ROM 2022, 2032, 2042, or 2052; RAM 2024, 2034, 2044, or 2054; or HD 2026, 2036, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. A "computer-readable medium" may be any type of data storage medium that can store computer instructions that are translatable by a processor. Examples of computer-readable media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like. Data may be stored in a single storage medium or distributed through multiple storage mediums, and may reside in a single database or multiple databases (or other data storage).

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit CPU or other processor, memory (e.g., primary or secondary memory such as RAM, ROM, HD or other computer readable medium for the persistent or temporary storage of instructions and data) and an input/output ("I/O") device. The I/O device can include a keyboard, monitor, printer, electronic pointing device (for example, mouse, trackball, stylus, etc.), touch screen or the like. In embodiments, the computer has access to at least one database on the same hardware or over the network.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise. Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the figures can also be implemented in a more separated or integrated manner, or even removed or rendered as inoperable in certain cases, as is useful in accordance with a particular application. Additionally, any signal arrows in the figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary, Abstract and figures are to be regarded in an illustrative rather than a restrictive sense, and all such modifications are intended to be included within the scope of invention.

What is claimed is:

1. A system comprising:
   a communication interface;
   a processor coupled to the communications interface; and
   a non-transitory computer readable medium coupled to the processor and storing a set of computer executable instructions executable by the processor to:
   receive an input capture flow comprising a first sequence of steps representing configurable code components of a document capture system, wherein a step in the first sequence of steps holds configuration information for a corresponding configurable code component;
   compile the input capture flow into a capture process that defines a processing order for the configurable code components and setup attribute values for the configurable code components, wherein compiling the input capture flow into the capture process comprises determining an optimized second sequence of steps that comprises steps from the first sequence of steps and compiling the second sequence of steps into the capture process, and wherein determining the second sequence of steps comprises:
      reordering, for parallel execution, a group of independent steps indicated in the input capture flow for sequential execution; and
      based on a determination that the input capture flow contains a duplicative step, eliminating the duplicative step, wherein compiling the input capture flow into the capture process comprises building an in-memory model of the input capture flow and manipulating the in-memory model to reorder the group of independent steps and eliminate the duplicative step; and
   deploy the capture process to the document capture system.

2. The system of claim 1, wherein the in-memory model comprises a directed graph of vertexes and edges with each vertexes representing the steps in the first sequence of steps and the edges representing links between steps in the first sequence of steps based on input and output attributes specified for the steps in the input capture flow.

3. The system of claim 2, wherein the computer executable instructions are executable to build the directed graph based on instruction scheduling rules.

4. The system of claim 2, wherein compiling the input capture flow into the capture process comprises identifying, from the directed graph, a set of steps of a same type that have identical input attributes and output attributes and eliminating all but one of the set of steps of the same type that have identical input attributes and output attributes.

5. The system of claim 2, wherein compiling the input capture flow into the capture process comprises ordering steps represented at a same level in the directed graph for parallel execution.

6. The system of claim 1, wherein the computer executable instructions are executable to provide a just-in-time compiler to compile the input capture flow into the capture process responsive to an operator request to run a process on a batch.

7. The system of claim 1, wherein the computer executable instructions are executable to provide a look ahead compiler to compile the input capture flow into the capture process, wherein the look ahead compiler performs capture flow optimization work before execution begins.

8. The system of claim 1, wherein the capture process comprises instructions to the document capture system specifying the configurable code components to use, the processing order for the configurable code components and the setup attribute values for the configurable code components.

9. A computer program product comprising a non-transitory computer readable medium storing a set of computer executable instructions, the set of computer executable instructions executable to:
   receive an input capture flow comprising a first sequence of steps representing configurable code components of a document capture system, wherein a step in the first sequence of steps holds configuration information for a corresponding configurable code component;
   compile the input capture flow into a capture process that defines a processing order for the configurable code components and setup attribute values for the configurable code components, wherein compiling the input capture flow into the capture process comprises determining an optimized second sequence of steps that comprises steps from the first sequence of steps and compiling the second sequence of steps into the capture process, and wherein determining the second sequence of steps comprises:
      reordering, for parallel execution, a group of independent steps indicated in the input capture flow for sequential execution; and based on a determination that the input capture flow contains a duplicative step, eliminating the duplicative step, wherein compiling the input capture flow into the capture process comprises building an in-memory model of the input capture flow and manipulating the in-memory model to reorder the group of independent steps and eliminate the duplicative step; and deploy the capture process to the document capture system.

10. The computer program product of claim 9, wherein the in-memory model comprises a directed graph of vertexes and edges with the vertexes representing the steps in the first sequence of steps and the edges representing links between steps in the first sequence of steps based on input and output attributes specified for the steps in the input capture flow.

11. The computer program product of claim 10, wherein the computer executable instructions are executable to build the directed graph based on instruction scheduling rules.

12. The computer program product of claim 10, wherein compiling the input capture flow into the capture process comprises identifying, from the directed graph, a set of steps of a same type that have identical input attributes and output attributes and eliminating all but one of the set of steps of the same type that have identical input attributes and output attributes.

13. The computer program product of claim 10, wherein compiling the input capture flow into the capture process comprises ordering steps represented at a same level in the directed graph for parallel execution.

14. The computer program product of claim 9, wherein the computer executable instructions are executable to provide a just-in-time compiler to compile the input capture flow into the capture process responsive to an operator request to run a process on a batch.

15. The computer program product of claim 9, wherein the computer executable instructions are executable to provide a look ahead compiler to compile the input capture flow into the capture process, wherein the look ahead compiler performs capture flow optimization work before execution begins.

16. The computer program product of claim 9, wherein the capture process comprises instructions to the document capture system specifying the configurable code components to use, the processing order for the configurable code components and the setup attribute values for the configurable code components.

* * * * *